Oct. 14, 1952 C. A. NEWBY ET AL 2,613,755
BATTERY HOLDING DEVICE
Filed Dec. 16, 1949
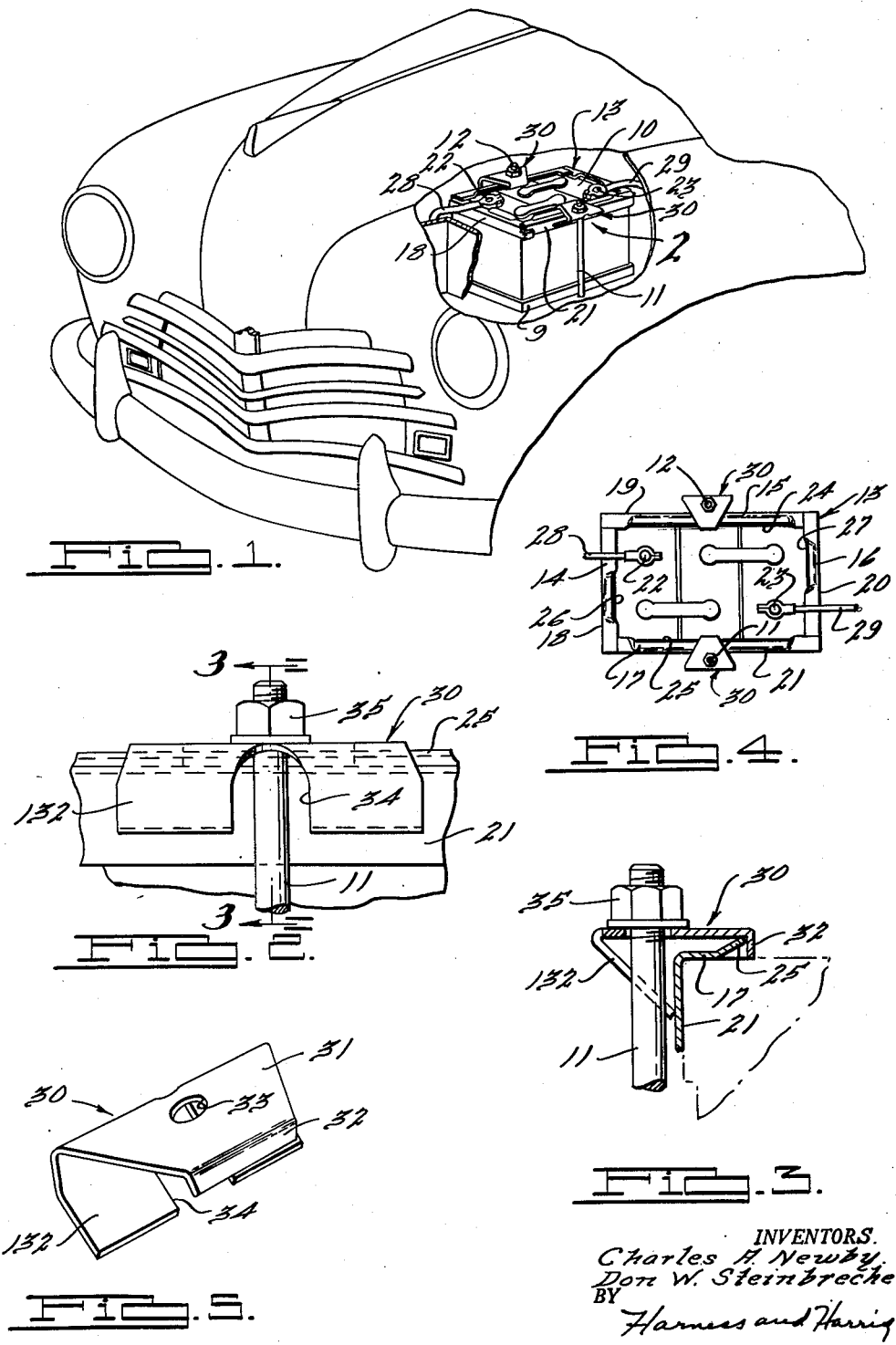
INVENTORS.
Charles A. Newby.
Don W. Steinbrecher.
BY
Harness and Harris
ATTORNEYS.

Patented Oct. 14, 1952

2,613,755

UNITED STATES PATENT OFFICE 2,613,755

BATTERY HOLDING DEVICE

Charles A. Newby, Hazel Park, and Don W. Steinbrecher, Detroit, Mich., assignors to Chrysler Corporation, Highland Park, Mich., a corporation of Delaware Application December 16, 1949, Serial No. 133,334

1 Claim. (Cl. 180—68.5)

The present invention relates to devices for holding articles in place, and in particular provides improved hold-down means adapted to be fitted over automobile storage batteries to hold them in place.

It will be seen from a complete understanding of the present invention, that it may be applied to holding down or otherwise cooperating with a wide variety of objects, and that the inventive features thereof may be embodied in widely differing forms. The preferred use of the invention, however, is as a so-called hold-down device for holding vehicle storage batteries in place within the frames or boxes ordinarily provided therefor.

In accordance with conventional practice, vehicle storage batteries are somewhat loosely received within a support provided therefor at a suitable point in the vehicle. In order to secure the battery within this support and to prevent rattling thereof, it is common practice to provide a frame which fits over the top of the battery, and while exposing the upper surface thereof, serves with other means to clamp the battery in its support. It has been proposed to provide the frame with a plurality of upwardly extending lips for receiving an improved type of clip at a plurality of locations.

Objects of the present invention are to provide an improved hold-down device of the above generally indicated character which may be readily applied to conventional batteries and secured thereto at a plurality of locations; to provide such a device with an improved clamp which distributes the stress applied thereto to more than one location on and over a substantial area of the frame; and to provide a hold-down device which may be economically and rapidly produced and which may be readily and quickly applied to a battery.

Other objects and advantages will become more apparent from the following description of one embodiment of our invention, reference being had to the accompanying drawings in which:

Fig. 1 is a perspective view of the front end of a vehicle having portions broken away to show our invention.

Fig. 2 is a fragmentary side elevational view as viewed in the direction of the arrow 2 of Fig. 1.

Fig. 3 is a sectional view taken on the line 3—3 of Fig. 2.

Fig. 4 is a plan view of the battery and hold-down device shown in Fig. 1.

Fig. 5 is a perspective view of the novel clip used in our invention.

In Fig. 1 we have shown a portion of a vehicle in which a conventional vehicle storage battery 10 of box-like configuration is seated upon a pan-like support 9 located underneath the hood of a motor vehicle. The support is provided with two upstanding bolts 11 and 12 which are used to secure the battery 10 on the support. To accomplish this securement, the battery is provided with a rectangular frame member, generally designated by the numeral 13, which fits over the upper horizontal edges of the battery box and extends downwardly adjacent the sides of the battery box. The frame member 13 comprises four pieces of metal of L-shaped cross sectional configuration which are welded, or in some other similar fashion, secured at their ends so that they make up a frame in the form of a rectangle. The frame member 13 comprises four substantially horizontal engaging sections 14, 15, 16 and 17 which are integrally connected to depending vertical supporting sections 18, 19, 20 and 21, respectively. The width of the vertical and horizontal sections may vary in accordance with the size of the battery but the widths should be governed by the amount of support needed as well as the distance of the binding posts, such as 22 and 23, of the battery 10 from the side portions of the battery box. The horizontal sections 15 and 17 are parallel and each is provided with an upwardly and inwardly inclined lip 24 and 25, respectively, the function of which will be hereinafter explained. Similarly, the horizontal sections 14 and 16 which are parallel are provided with upwardly extending inclined lips 26 and 27, the function of which will similarly be hereinafter explained. Unlike the lips 24 and 25 which extend substantially the entire length of the inner lateral edge of the sections 15 and 17, the lips 26 and 27 extend approximately only half way across the sections 14 and 16, respectively, so that cable connectors 28 and 29 of the posts 22 and 23, respectively, may lead from the post without encountering a raised lip.

As shown in the drawings, the upstanding bolts 11 and 12 are disposed adjacent the sections 19 and 21 of the frame member 13. In order that the bolts may be secured to the frame member 13 so that the battery 10 may be held in place, we have provided new and improved coupling members or clamps, generally designated by the numeral 30, for operatively connecting the bolts to the frame member. The clamp 30 comprises a substantially horizontal portion 31 of trapezoidal configuration which has an integrally connected depending portion 132 which makes an angle of approximately 45° with the horizontal portion 31 and during application of the clip, bracingly supports the portion 31. The free end extremity of the horizontal portion 31 is provided with a depending vertical flange 32 to insure positive engagement of the clamp with the frame member and preferably with the edge portion of one of its inclined lips. The horizontal portion 31 is also provided with a hole 33 for receiving the bolt 11 while the depending portion 132 is provided with a relatively large slot 34 which permits the bolt to extend downwardly therethrough.

In the application of the clamp 30 to the frame member 13, as more clearly shown in Figs. 2 and 3, the flange 32 is positioned to engage the lip 25, the horizontal portion 31 extending outwardly therefrom so that the free end of the depending portion 132 engages the vertical section 21 of the frame member 13. In this manner, the bolt 11 extends upwardly through the slot 34 and the hole 33 and receives a nut and washer assembly 35 on the end thereof. The washer of this assembly engages the horizontal portion 31 of the clamp 30 adjacent the periphery of the hole 33 and exerts pressure downwardly in response to tightening of the nut. When the nut is tightened, pressure is exerted by the flange 32 and the free end of the depending portion 132 on the lip 25 and the vertical section 21, respectively. It may be seen, therefore, that pressure is equally distributed between the horizontal and vertical sections which is obviously advantageous since neither section is required to carry the entire load.

As illustrated in the drawings, the battery hold-down frame is provided with two clamps which cooperate with the bolts 11 and 12 for holding the frame on the battery and urging the battery against the pan 9. It should be noted, however, that the lips 24 and 25 extend approximately throughout the major length of the inner lateral edges of the sections 15 and 17 and therefore, the clamps 30 may be utilized at any location where the flange 32 can engage the lip provided that the associated support means, such as the bolts 11 and 12, extend upwardly at such a location.

The clamps 30 may also be secured at the short ends of the frame 13 by engagement with the lips 26 and 27. In this manner the clamps would be disposed diagonally from each other, leaving space at one side of each for the passage of the connectors 28 and 29.

We have found that the use of a slot in the depending portion 132 adds to the versatility of our improved clamp. The slot 34 does not limit the angle at which the bolt extends to the clamp. The clamp could therefore be applied to batteries which are not held down by bolts that are perfectly vertical.

By employing our improved type of battery hold-down device, the clamps may be disposed at various locations depending on the locations of the bolts 11 and 12. Also our improved clamp distributes the stresses applied to it to both the horizontal and vertical sections of the frame thereby eliminating undue stress at any one point of the clamp or any one section of the frame which is frequently the cause of failure.

The frame and clamps may be made of metallic or non-metallic materials but is preferably made of metallic materials having coatings which are resistant to the acids commonly used in vehicle storage batteries.

While we have illustrated and described but one embodiment of our invention, it is to be understood that such is for the purpose of illustration only, and it is contemplated that those skilled in the art may modify certain details without departing from the spirit or scope of the invention as defined in the claim appended hereto.

We claim:

Apparatus for releasably clamping a battery in a predetermined location, including a supporting member for receiving the bottom of said battery, a pair of hold-down bolts, each located adjacent a different side wall of said battery respectively, a frame member receivable on the upper extremity of said battery including angular side members having top and side sections substantially parallel to the upper extremity and side walls respectively of said battery, an elongated raised lip on the free edges of said top sections of at least two of said frame side members, a pair of clamping members each engageable with one of said side members of said frame at a plurality of locations thereon and each including a first section having a flange interlockingly engageable with one of said raised lips respectively and a second section inclined at an acute angle to said first section and having an edge engageable with said side section of one of said side members respectively for bracingly holding said first section of said clamping member in a plane generally parallel to the upper extremity of said battery, said first and second sections of each of said clamping members having registering openings therein for receiving one of said hold-down bolts respectively, and means on said hold-down bolts engageable with said first sections of said clamping members for retaining said clamping members in selected fixed positions relative to said frame and securely fixing said battery against movement relative to said support.

CHARLES A. NEWBY.
DON W. STEINBRECHER.

REFERENCES CITED

The following references are of record in the file of this patent:

UNITED STATES PATENTS

| Number | Name | Date |
|---|---|---|
| 783,099 | Bryant | Feb. 21, 1905 |
| 1,172,347 | Ford | Feb. 22, 1916 |
| 1,429,952 | Kearney | Sept. 26, 1922 |
| 1,772,847 | Taylor | Aug. 12, 1930 |
| 2,491,997 | Meyer | Dec. 20, 1949 |